Nov. 21, 1933.  A. C. CASTLE  1,936,349
MATERIAL FOR COATING WELDING RODS
Filed Jan. 25, 1932
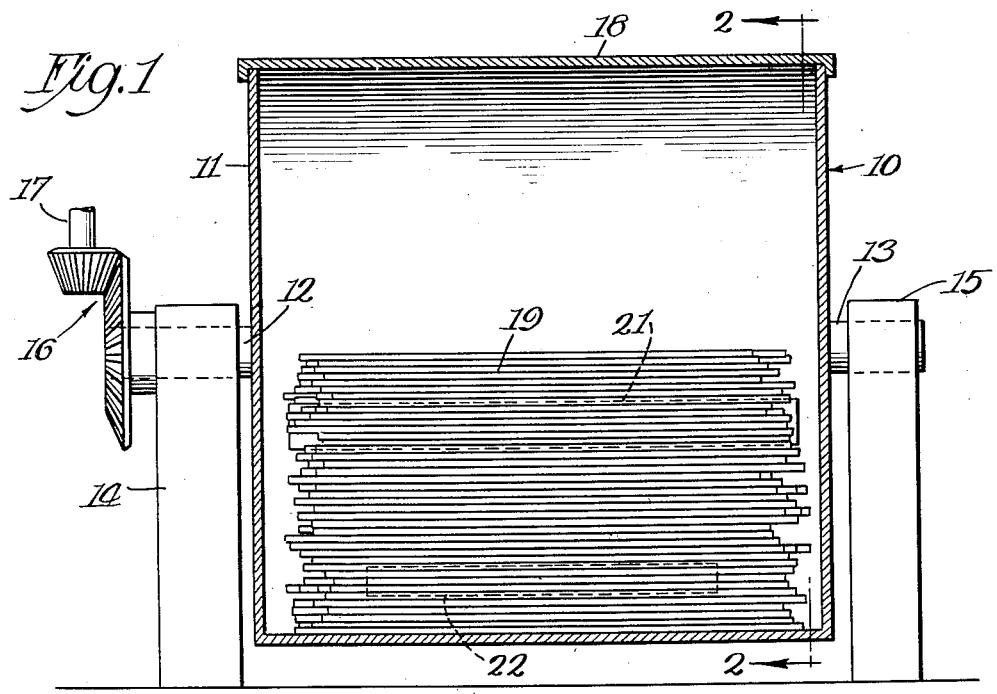
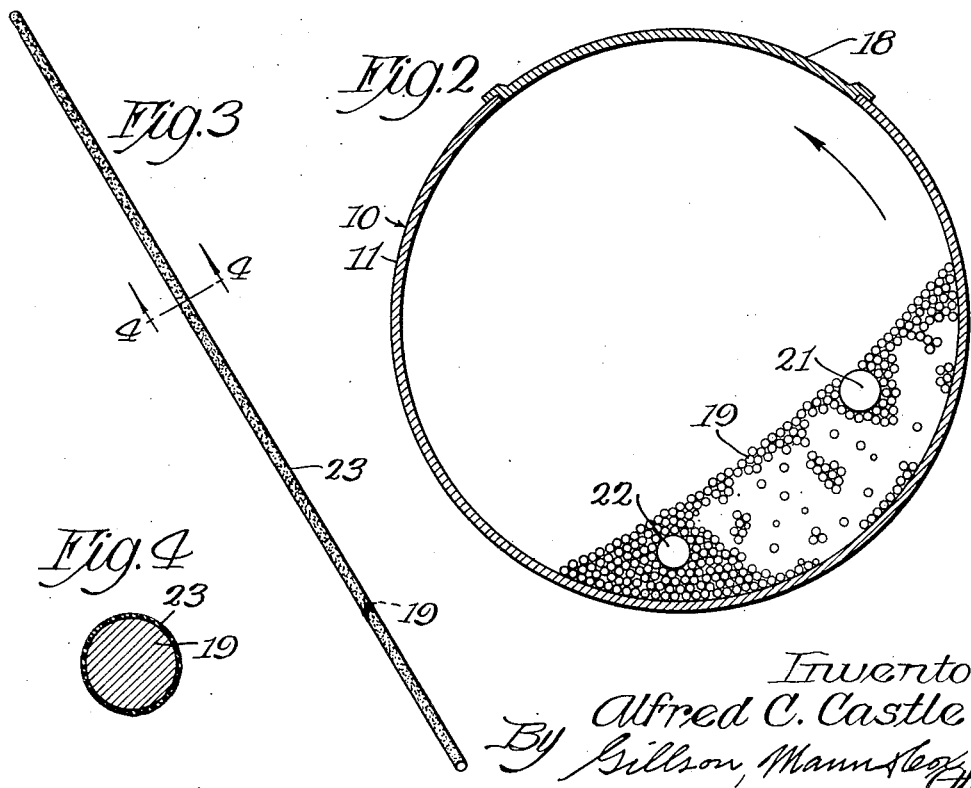
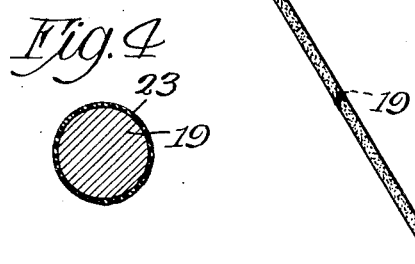
Inventor
Alfred C. Castle
By Gillson, Mann &c.
Attys.

Patented Nov. 21, 1933

1,936,349

UNITED STATES PATENT OFFICE 1,936,349

MATERIAL FOR COATING WELDING RODS

Alfred C. Castle, Lake Forest, Ill., assignor to A. M. Castle & Co., a corporation of Illinois Application January 25, 1932. Serial No. 588,600

8 Claims. (Cl. 219—8)

This invention relates to welding rods, and, more particularly, to the coating therefor and the method of applying the coating thereto.

One of the objects of the invention is the provision of a new and improved composition for use as a coating material for welding rods.

Another object of the invention is the provision of a new and improved method for coating welding rods and the like.

A further object of the invention is the provision of a new and improved method of coating welding rods and the like which is inexpensive to perform, resulting in a coating uniform in thickness and that adheres to the rod.

Other and further objects and advantages of the invention will appear from the following description taken in connection with the accompanying drawing, in which Fig. 1 is a vertical section of an apparatus for coating the welding rods;

Fig. 2 is a section on line 2—2 of Fig. 1;

Fig. 3 is a perspective view of one of the welding rods after it has been coated;

Fig. 4 is a section on line 4—4 of Fig. 3.

In electrical welding, it is common practice to cover or coat the welding rod with a flux material. In order to obtain satisfactory results in the use of welding rods, it is necessary, or, at least, highly desirable—that the coating be uniform as otherwise the arc cannot properly be controlled. The rods are usually covered by dipping the same in the coating material while in fluid or plastic form, or the material is extruded onto the rod or in other types of covering, as asbestos or paper, the material is wound on the rod.

The dipping process results in lack of uniformity and the other processes are too expensive, and in some instances impossible or impractical for the cheaper types of rods.

The present invention seeks to remedy these defects by a process that will impress the material on the rods in such a manner that the coating will be of uniform thickness and will be effectively attached to the rod.

It has been found by experiment that the coating may be applied to the rods by impressing the same thereon.

Any suitable mechanism may be employed for applying the coating. In the form of construction shown, which is by way of example only, a rotating device 10 shown more or less diagrammatically on the drawing is employed for this purpose. This device is of substantially the same construction as a tumbling mill and comprises a cylindrical container or barrel 11 having axial journals or trunnions 12 and 13 journaled in bearings in the supports 14 and 15. The cylinder or barrel 11 is rotated by a reduced gearing 16 from the power shaft 17.

The barrel or cylinder 11 is provided with the removable closure 18 held in position by any suitable means as is usual in such constructions.

In applying the coating material, a large number of these rods are placed in the cylinder or drum 11 with their axes parallel with the axis of the drum, and after the addition of the coating material and the securing of closure 18 in position, the drum is rotated until the material has been impressed on the rods.

Any suitable coating material may be used.

The following mixture has been found to give excellent results:

|  | Ounces |
|---|---|
| Trisodium phosphate | 3 |
| Powdered magnesia | ¾ |
| Calcium carbonate | 9 |
| Zinc oxide | ½ |
| Common borax or borax glass | 4 |

The following apparatus for carrying out the process has been found to give satisfactory results and is by way of example only as it is understood that apparatus other than that disclosed may be employed for impressing the material on the rods.

Into the cylinder or barrel 11, which for the purpose of illustration may be considered as being about 18 inches in diameter and 18 inches long, is placed a charge of about 100 lbs. of metal wires or rods 19 suitable for welding rods. The amount of wires will vary, but, as shown, they will occupy about one-third of the diameter of the barrel. These wires or rods may be of the same or different diameters. In the drawing, they are shown as ranging from ⅛" to ⅜" in diameter and 14" in length. Preferably one or more heavy cylindrical bars 21 or 22 are placed within the container with the welding rods. In the above example, two bars are used. The bar 21 is about 1¼" in diameter and longer than the rods 19 and the bar 22 is about 1" in diameter and is shorter than the rods 19. The dimensions of the bars are not material so long as they are comparatively heavy.

For coating the above, about 4½ oz. of the coating material in the dry state is placed within the barrel with the rods.

The barrel is rotated at approximately 36

R. P. M. about 25 or 30 minutes, after which the rods are removed and are ready for use.

While it is not well understood just how the material is impressed on the rods, the material has the appearance of having been rolled thereon and forced into the pores of the metal. The material is firmer and adheres much better than rods treated by dipping the same in a fluid or plastic mass of this same material and afterward dried.

In coating welding rods by dipping, it is common practice to pickle or chemically treat the rods in order to remove the rust and other foreign matter, but with the above method no pretreatment of the rods is necessary although the rods may be cleaned if desired. This is considered an important feature of the invention since it eliminates one operation in preparation of the rods.

For coating rods 18" and longer, a longer drum must, of course, be employed. The dimensions of the rods and bars and the size of the drum, its rate of rotation, the number or sizes of the rods treated and the material of the coating may be changed as desired or as occasion may demand.

One of the coated rods 19 is shown in Figs. 3 and 4 and comprises the rod proper 19 and the coating 23 extending in a uniform thickness about the rod.

Substantially this same formula may be used by the addition of water, to form a fluid or paste for coating the rods by dipping.

The material may be improved by the addition of a slight amount of formaldehyde thereto. The following mixture has been found to give satisfactory results:

| | |
|---|---|
| Trisodium phosphate | 3 oz. |
| Powdered magnesia | ¾ oz. |
| Formaldehyde | 3 drops |
| Calcium carbonate | 9 oz. |
| Zinc oxide | ½ oz. |
| Water 32 L. M. (liquid measure) | 12 oz. |
| Common borax or borax glass | 4 oz. |

In mixing the materials, the following method has been found to give satisfactory results; first, dissolve the trisodium phosphate and borax before adding the other ingredients; after all of the ingredients have been added the whole mass is thoroughly mixed in a water jacketed container which is adapted to heat the mixture from 130 degrees to 140 degrees Fahrenheit. The rods are coated by dipping them in this mixture and allowing them to dry, repeating the dipping operation until the coating is of desired thickness.

While definite amounts of the material are given in the formula as outlined above, it is understood that these proportions may be varied and that the formulæ given are by way of example only. While the formulæ given include zinc oxide as one of the ingredients, it is understood that it may be omitted entirely, if desired.

What I claim, therefore, is:

1. A composition for coating an electric welding rod comprising slag forming material, tri-sodium phosphate and borax as a binder, the combined sodium phosphate and borax constituting more than 20% and not over 45% of the composition.

2. A composition for coating an electric welding rod comprising calcium carbonate, tri-sodium phosphate and borax, the tri-sodium phosphate constituting a smaller percentage of the mass than the calcium carbonate or the borax.

3. A composition for coating an electric welding rod comprising calcium carbonate as the major ingredient and trisodium phosphate, the latter being less than 50% of the calcium carbonate.

4. A composition for coating an electric welding rod, comprising trisodium phosphate, magnesia, borax, zinc oxide and calcium carbonate, the calcium carbonate constituting the major portion of the composition, the amount of the magnesia and tri-sodium phosphate together being not greater than the amount of borax in said composition.

5. A composition for coating an electric welding rod consisting of the following:

| | Ounces |
|---|---|
| Trisodium phosphate | 3 |
| Powdered magnesia | ¾ |
| Calcium carbonate | 9 |
| Zinc oxide | ½ |
| Common borax or borax glass | 4 |

6. A welding rod consisting of a metallic rod having a coat thereon comprising trisodium phosphate, magnesia, borax, zinc oxide and calcium carbonate, the calcium carbonate constituting the major portion of the composition, and the amount of tri-sodium phosphate and borax together being less than the amount of calcium carbonate.

7. A composition for coating an electric welding rod comprising trisodium phosphate, powdered magnesia, calcium carbonate, zinc oxide and borax, the calcium carbonate constituting more than half of the composition, and the tri-sodium phosphate and borax constituting substantially 40% of the composition.

8. An electric welding rod comprising a metallic rod, a coat thereon to form a flux, said coat comprising: Trisodium phosphate, powdered magnesia, formaldehyde, calcium carbonate, zinc oxide, and common borax or borax glass, the calcium carbonate constituting the major portion of the coating material, and the tri-sodium phosphate and borax constituting not less than 10% or more than 25% of the coating material.

ALFRED C. CASTLE.